United States Patent
Teskey

(10) Patent No.: US 6,602,126 B1
(45) Date of Patent: Aug. 5, 2003

(54) REDUCED OPENING VENTILATOR

(75) Inventor: Gregg A. Teskey, Trabuco Canyon, CA (US)

(73) Assignee: Ryadon, Inc., Foothill Ranch, CA (US)

( * ) Notice: Subject to any disclaimer, the term of this patent is extended or adjusted under 35 U.S.C. 154(b) by 0 days.

(21) Appl. No.: 10/166,205

(22) Filed: Jun. 10, 2002

(51) Int. Cl.$^7$ .............................. B60H 1/26; F24F 13/10
(52) U.S. Cl. ........................................ 454/145; 454/273
(58) Field of Search ............................. 454/145, 149, 454/158, 273, 333

(56) References Cited

U.S. PATENT DOCUMENTS

| | | |
|---|---|---|
| 3,358,576 A | 12/1967 | Kelly et al. |
| 3,366,027 A * | 1/1968 | Kelly .................... 454/145 |
| 3,372,631 A * | 3/1968 | Kelly .................... 454/145 |
| 3,375,772 A | 4/1968 | Kelly et al. |
| 3,672,291 A | 6/1972 | Kujawa, Jr. |
| 3,763,760 A | 10/1973 | Erickson |
| 3,839,950 A | 10/1974 | Kelly et al. |
| 4,452,129 A | 6/1984 | Kelly et al. |
| 5,020,425 A | 6/1991 | Kelly |
| D390,943 S | 2/1998 | Kelly |
| D393,707 S | 4/1998 | Kelly |
| 5,766,068 A | 6/1998 | Kelly |
| 6,126,538 A | 10/2000 | Kelly et al. |
| 6,280,315 B1 | 8/2001 | Kelly |
| D450,113 S | 11/2001 | Teskey |
| D461,551 S | 8/2002 | Teskey |

* cited by examiner

*Primary Examiner*—Harold Joyce
(74) *Attorney, Agent, or Firm*—Fulwider Patton Lee & Utecht, LLP

(57) ABSTRACT

The present invention provides a two-way vent for a vehicle that opens in a front and rear direction and includes a preferably symmetric cam having an apex on its centerline, and first and second convex sides each terminating respectively in a recess at the base of the cam. The degree of opening of the vent is determined by the displacement of a follower rod with respect to the apex of the cam. From its originally closed position with the follower positioned at the apex, the vent can be opened either forward or backward by selectively moving a handle that actuates the follower along the curved paths defined by the convex sides. The cam preferably includes a lateral cusp at the end of each curved path, the cusp defining a transition from the curved path to the recess.

22 Claims, 4 Drawing Sheets

REDUCED OPENING VENTILATOR

BACKGROUND OF THE INVENTION

1. Field of the Invention

The present invention relates generally to ventilators, and more particularly to a manually actuated two-way vehicle ventilator having a cam and follower assembly adapted to limit the opening of the vent.

2. Description of the Prior Art:

Two-way hingeless ventilators of the present type are well known by those of skill in the art, and the operation thereof is described in detail in U.S. patents, particularly U.S. Pat. No. 6,280,315, U.S. Pat. No. 5,766,068, U.S. Pat. No. 4,452,129, and U.S. Pat. No. 3,839,950, the disclosures of which are incorporated herein by reference. In certain vehicles it is desirable to introduce ventilation through a manually actuated dedicated vent located in a roof or sidewall of the vehicle. These vents open both toward and away from the oncoming flow of air when the vehicle is in motion to introduce and expel air, respectively. The vent may open in stages determined by rest positions along a cam or track that cooperates with guide ends of a tensioning rod to set the position of the vent. The guide ends are biased against the cam or inside the track by the tensioning rod's cooperation with guide arms mounted on the cover or lid. With detents at intermittent locations on the cam, the vent provides some options for selecting the degree of opening of the vent. However, a by-product of existing cams such as the generally triangular cams is that the vent continues to open at a generally constant rate as the guide ends travel along the cam from the closed to the fully open position. Moreover, there is not a stable and secure receiving recess on the cam surface to ensure that the guide end does not inadvertently move on the cam.

It has been determined by the present inventor that the prior art vents open too wide in some instances, causing a hazard when the vents are disposed on the side of the vehicles. Namely, the vents when open can catch on objects and damage both the vehicle and surrounding objects, or the vent could injure a person standing by the vehicle. Thus, the art would benefit from a vent design that would limit the opening of the vent in comparison with the existing vents.

SUMMARY OF THE INVENTION

The present invention provides a two-way vent that comprises a pivoting lid that cooperates with an opening in a frame to selectively open and close the vent. A handle is mounted to the pivoting lid through a connected tensioning rod that rides on a pair of preferably symmetric cams at a pair of rollers on each end. Actuation of the handle causes the lid to pivot about the frame at a forward or rear edge as the rollers travel along the cams' surfaces. To control the degree of pivoting of the lid, and hence the degree of opening of the vent, the cam surface is selected to have a shape generally comprising an apex on its centerline, and first and second convex sides each terminating respectively in a recess adjacent the base of the cam. The first and second cam surfaces preferably includes a lateral cusp defining a transition from the convex surface to the recess. The recesses provide a stable position for the rollers that makes it unlikely that the roller can be inadvertently displaced due to wind gusts or vibration. Moreover, the degree of opening of the vent as the rollers ride the cam surfaces of the present invention is reduced by the narrowing and shortening of the cam. In a preferred embodiment the convex sides of the cam are circular in profile, and the recesses are circular in profile.

BRIEF DESCRIPTION OF THE DRAWINGS

The exact nature of this invention, as well as its objects and advantages, will become readily apparent to one of skill in the art upon reference to the following detailed description when considered in conjunction with the accompanying drawings, in which like reference numerals designate like parts throughout the figures thereof, and wherein.

DETAILED DESCRIPTION OF THE PREFERRED EMBODIMENT

Figure 1:
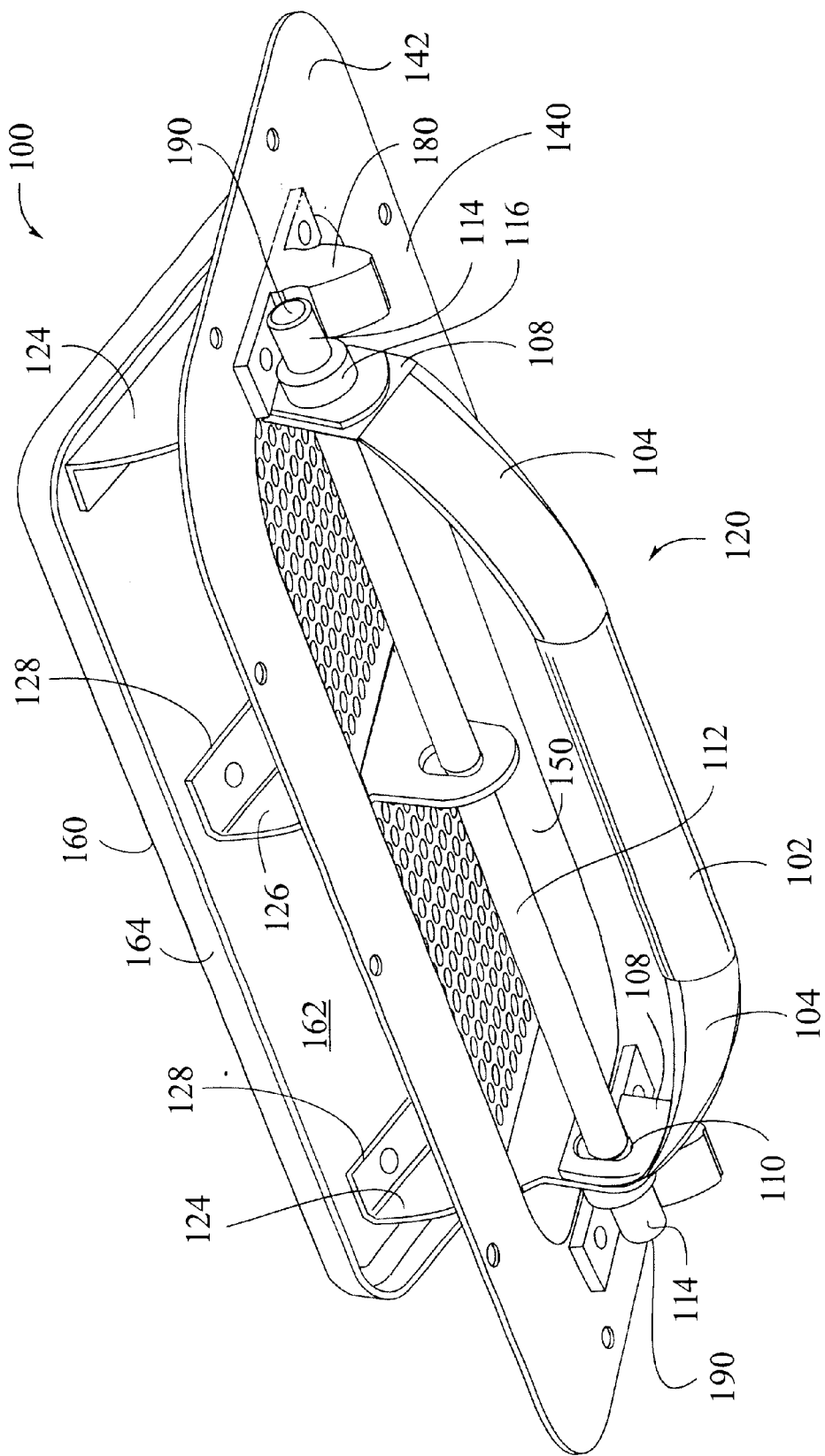
FIG. 1 is an lower perspective view of a first preferred embodiment of the present invention.
Figure 2:
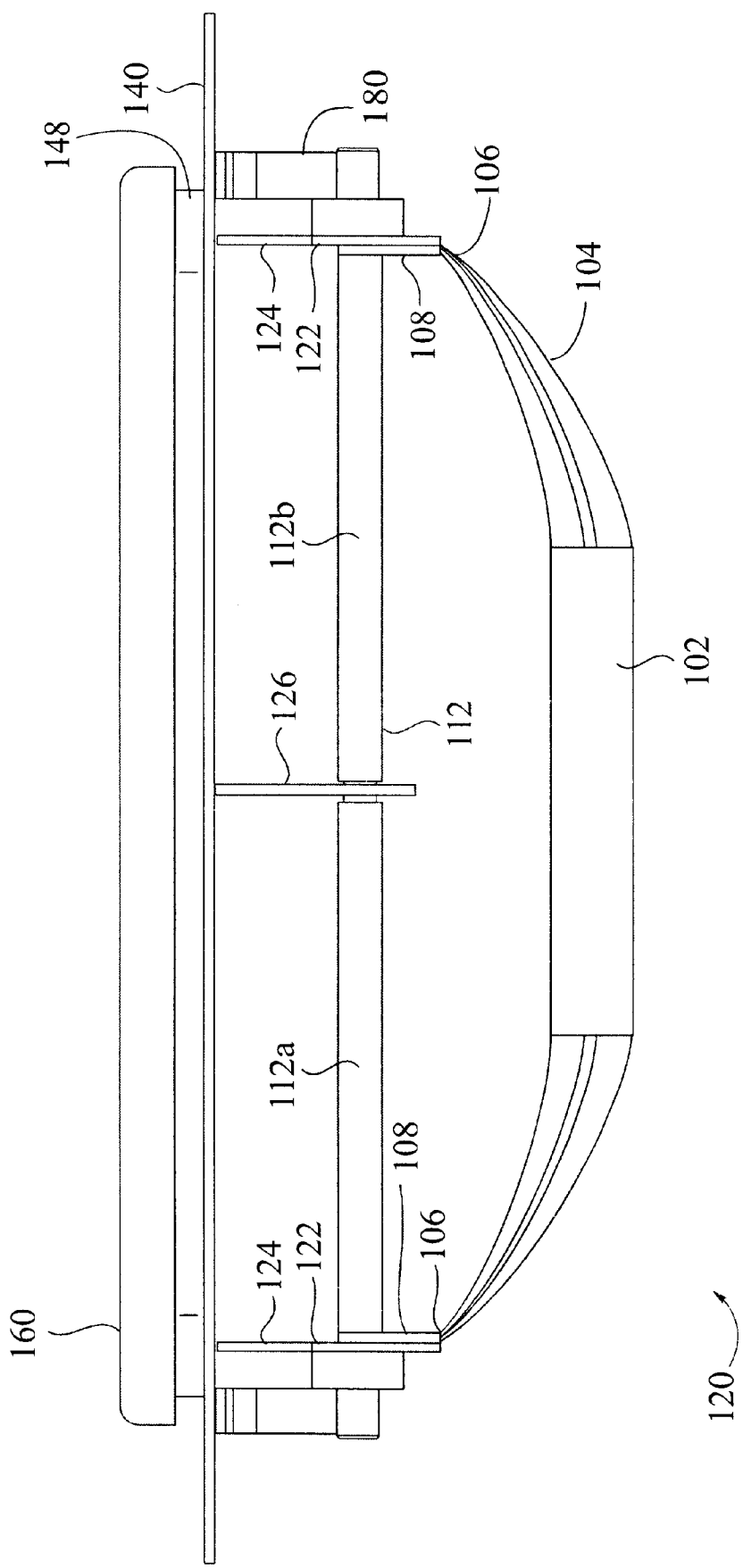
FIG. 2 is a front view of the first preferred embodiment of FIG. 1.
Figure 3:
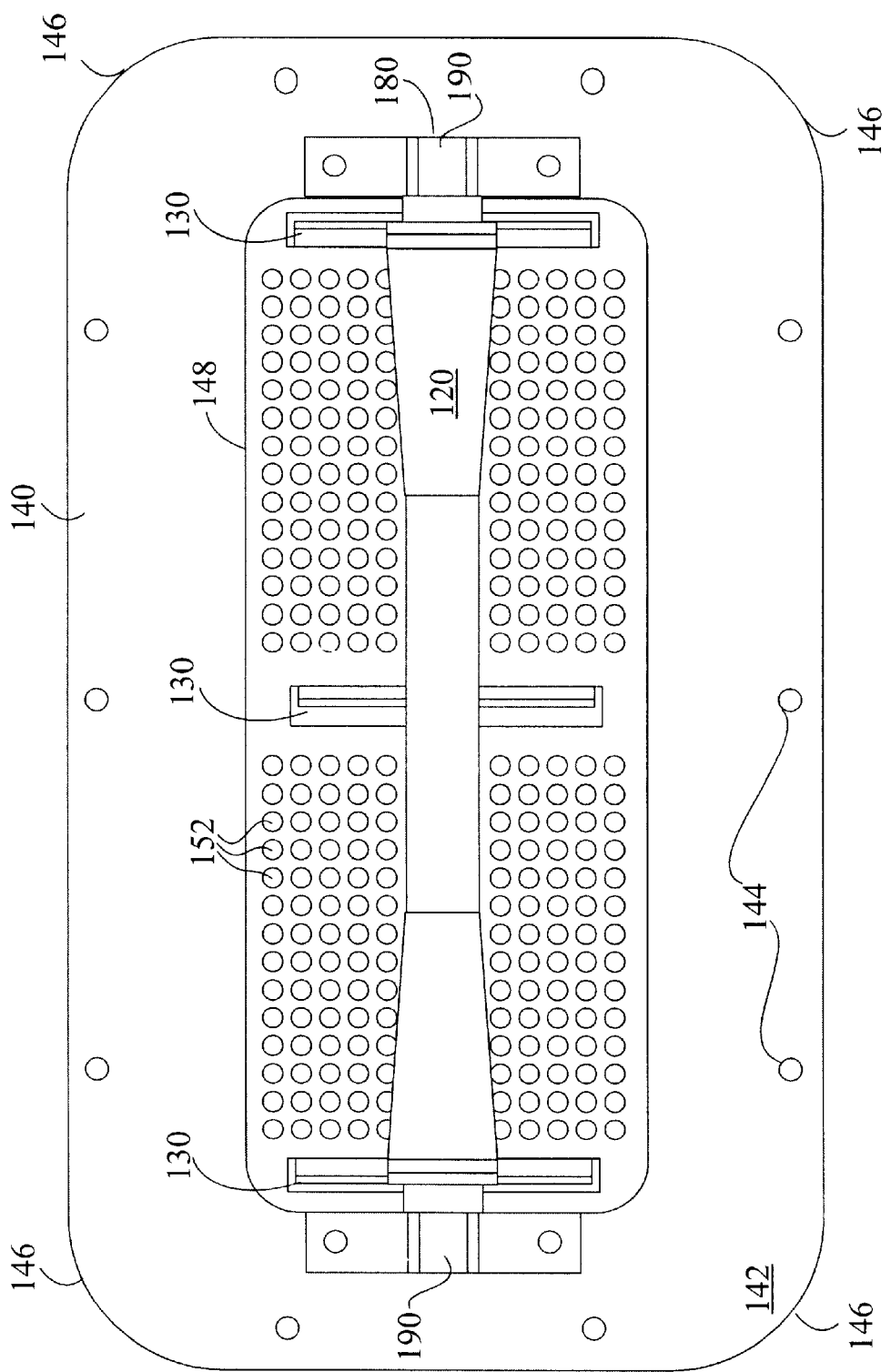
FIG. 3 is a bottom view of the first preferred embodiment of FIG. 1.
Figure 4:
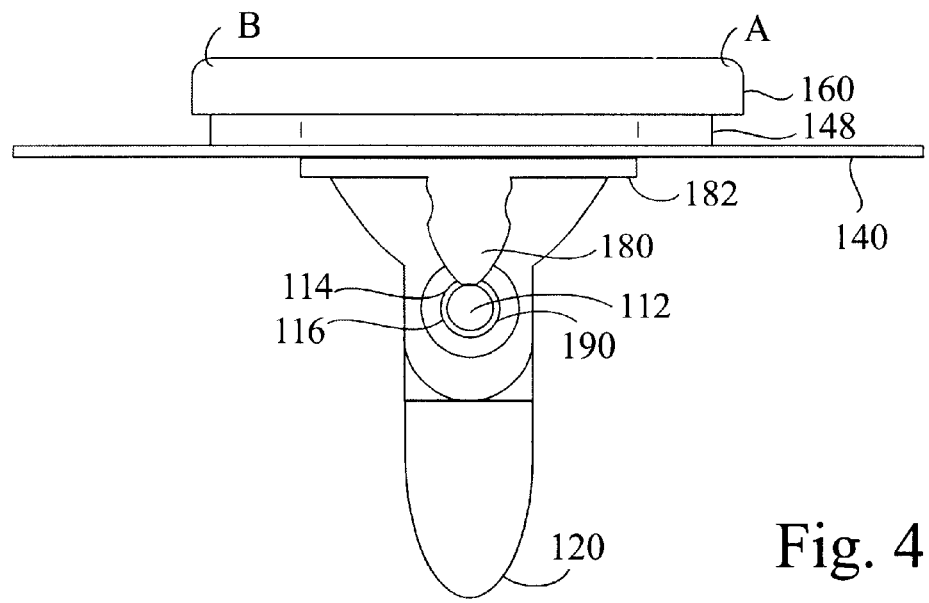
FIG. 4 is a side view of the first preferred embodiment of FIG. 1 in a closed position.

The following description is provided to enable any person of ordinary skill in the art to make and use the invention and sets forth the best modes contemplated by the inventor of carrying out his invention. Various modifications, however, will remain readily apparent to those skilled in the art, since the general principles of the present invention have been defined herein specifically to provide a vehicle vent with a reduced opening mechanism.

FIGS. 1 through 5 illustrate a first preferred embodiment of the present invention. A vent generally denoted 100 comprises generally a handle 120, a base plate 140, a lid 160, and a cam 180 and follower 190 for setting the degree of vent openness. The handle 120 is an elongate bar that has a cylindrical middle section 102 positioned for gripping. The cylindrical middle section 102 transitions to first and second end sections 104 that gradually taper from the cylindrical profile at the juncture with the middle section to a flattened profile at the ends 106. Each end 106 of the handle 120 terminates in a bracket 108 oriented generally perpendicular to the longitudinal axis of the handle 120 and parallel to each other, such that the handle 120 and the brackets 108 have a U-shaped profile with an elongate base and short sides. Each bracket 108 includes an elongate hole 110 aligned for receiving a tensioning rod 112 therein where the tensioning rod 112 spans the length of the handle 120 and projects longitudinally outward through each hole 110 in the handle's brackets 108. The ends of the tensioning rod 112 that projects through each bracket 108 of the handle 120 are enclosed by an annular roller 114 with an integral annular collar 116 of a larger diameter than the elongate hole 110 of the handle's bracket 108. The collar 116 is fixed on the tensioning rod 112 and adjacent to the handle 120 such that the collar 116 secures the tensioning rod 112 in the brackets 108 of the handle 120 between the two elongate holes 110. The roller 114 extends axially outward from the collar 116 and functions as a follower 190 for the cam 180 as explained in greater detail below. To locate the tensioning rod 112 in the brackets 108 of the handle 120 with the collars 116, the rod 112 may be comprised of two halves 112a,b that each have a collar 116 on one end and join together at the other end in a locking relationship. Each half 112a,b of the rod 112 is inserted into the handle bracket 108 with the collar 116 just outside of the bracket 108, and joined together at the other end in a locked arrangement.

The tensioning rod 112 passing through the brackets 108 on the handle 120 additionally pass through elongate holes 122 in a pair of side supports 124 and a middle support 126. The side supports 124 and middle support 126 comprise bell-shaped metal plates oriented parallel to one another and rigidly mounted at a first end 128 to the lid 160. The connection to the lid 160 can be accomplished by providing a first end 128 of each support perpendicular to the main portion of the support to achieve an L-shaped configuration, and fastening, welding, or otherwise adhering the first surface 128 with the adjoining surface of the lid 160. The contour of the supports' sides are preferably convex along a bottom portion adjacent to the lid 160 to accommodate the rotational movement of the side supports 124 and middle support 126 through respective slots 130 on the base plate 140 as described in more detail below. The upper portion of each of the supports includes an elongate hole 122 equally spaced from the bottom of the support and aligned to be co-linear with each other. The elongate holes 122 of the supports mount the tensioning rod 112 that passes through the handle brackets 108, thereby linking the handle 120, supports 124,126 and lid 160 in a fixed relationship. That is, the handle 120, supports 124,126, and lid 160 move and pivot as a single rigid structure.

The lid 160 comprises a generally rectangular plate 162 with a rim 164 extending around a perimeter. The interior of the lid 160 may preferably include a padding (not shown) on the inner face to dampen any noise generated by contact of the lid 160 with the base plate 140. The padding will include cut-away portions where the side and middle supports 124,126 contact the lid 160.

The base plate 140 generally comprises a base flange 142 oriented in a first plane with a plurality of spaced apart apertures 144 around the perimeter for mounting the base plate 140 to a top or side surface of the vehicle (not shown). The base flange 142 is preferably rectangular in nature with rounded corners 146 at the external edge junctures. At the interior of the base flange 142 includes a raised rectangular grating 148. A shoulder 150 extending along a rectangular perimeter of the grating 148 separates the grating 148 from the base flange 142 and defines the height of the raised grating 148. The shoulder 150 of the base flange 142 is sized to coincide with the rim 164 of the lid 160 such that the rectangular lid 160 fits over the raised rectangular grating 148 of the base plate 140 when the vent 100 is closed. The grating 148 comprises an array of closely spaced holes 152 for allowing air to pass through but prevents any debris from entering the vehicle. The raised grating 148 further includes three elongate slots 130 extending generally its width at a middle section and at each end thereof. The three elongate slots 130 are aligned to coincide with, and receive therein the respective middle 126 and side supports 124.

Figure 6:
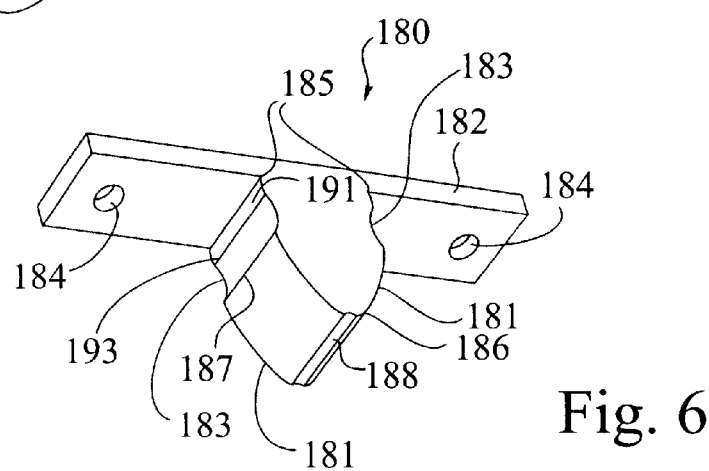
FIG. 6 is a lower perspective view of the cam and spacer of the present invention.

Mounted on the opposite ends of the base flange 142 of the base plate 140 are a pair of cams 180. As shown in FIG. 6, each cam 180 is preferably integrally formed with a spacer 182 comprised generally of an elongate rectangular bar with a pair of holes 184 therein to secure the cam 180 to the base plate 140 via fasteners (not shown). Fasteners pass through the holes 184 in the spacer 182 and the base flange 142 of the base plate 140 to fix the cam 180 in the designated position. The cam 180 comprises a projection that preferably symmetric with respect to a vertical axis and includes an apex 186 at the centerline of the symmetry with a slight indentation 188 at the apex 186 for resting a cylindrical follower 190 thereon. The cam 180 includes a pair of convex sides surfaces 181 connecting the apex 186 with a pair of recesses 183 at the base 185 of the cam 180. The convex surfaces 181 in a preferred embodiment are circular with a radius larger that the height of the cam 180 above the spacer 182, to provide a smooth path for a follower 190 from the apex 186 to a recess 183. At the base 185 of the cam 180 on each side is a recess 183 sized to receive the follower 190 therein. The transition from the convex side surfaces 181 to the recesses 183 results in a pair of lateral cusps 187 that form a local farthest point from the centerline of symmetry. Like the indentation 188 at the apex 186, the recesses 183 provide a stable resting position for the follower 190, and an increased force on the handle is required to displace the follower from the recesses. The placement of the follower 190 within the recesses 183 defines the open position for the vent 100.

Adjacent to the recesses are short, curved segments 191, extending along the curved path defined by the curved side surfaces 181, that connect the recesses with the spacer 182. The juncture between the recesses 183 and the curved segments 191 form a second pair of lateral cusps 193, that may extend laterally just beyond the extent of the first pair of lateral cusps 187. The distance between the spacer 182 and the lateral cusps 193 is preferably less than the height of the spacer 182 and is set to preferably have the follower 190 rest against the spacer 182 while located in the recess 183. The first pair of lateral cusps 187 are approximately in the middle of the cam 180, such that the distance between the spacer 182 and the lateral cusps 187 is approximately equal to the distance between the lateral cusps 187 and the apex 188.

The cooperation of the various components will now be described. The base plate 140 is mounted over a pre-established port or opening in the vehicle such that the grating 148 permits ventilation to the vehicle's interior. In the closed position (see FIG. 4), the handle 120 depends perpendicular to the base plate 140 and the tensioning rod 112 passing through the handle 120 is positioned at the apex 186 of the each cams 180 at the annular rollers 114. The position and height of the cam 180 is partially determined by the height of the spacer 182 and preferably locates the tensioning rod 112 at a maximum distance from the base plate 140, placing the supports 124,126 in tension and forcing the follower 190 on the cam 180. The relative angular position α of the lid 160 with respect to the base plate 140 is associated with the position of the followers 190 on the cam 180. This can be seen in FIGS. 4 and 5, where the position of the follower 190 at the apex 186 of the cam 180 results in a zero angular displacement, while the position of the follower 190 in the recess 183 of the cam 180 results in a maximum angular displacement or wide open.

Figure 5:
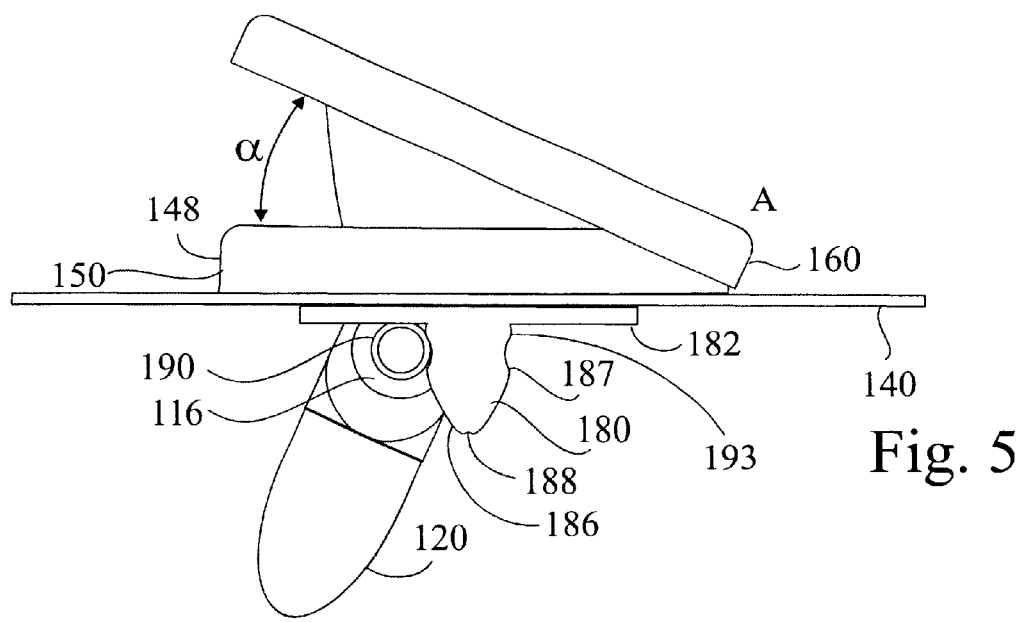
FIG. 5 is a side view of the first preferred embodiment of FIG. 1 in an open position.

To open the vent 100, the handle 120 is moved forward or backward from its initial position (see FIG. 5). Since the handle 120 is rigidly connected to the lid 160 through the supports 124,126, and the lid 160 is in contact at front and back edges A, B against the base plate 140, movement of the handle 120 will cause the handle/support/lid structure to pivot about the contact with the base plate 140 at A or B. That is, a forward movement of the handle 120 (as shown in FIG. 5) will cause the handle/supports/lid structure to pivot about a contact edge A along the back of the lid 160 with the base plate 140. Similarly, movement of the handle 120 backward will cause the handle/support/lid structure to pivot about a contact edge B along the front portion of the lid 160 with the base plate 140. The rotation of the lid 160 and supports 124,126 about the base plate 140 is accommodated by the slots 130 in the base plate 140 that receive the supports 124,126 and the curvature of the supports at their respective lower portions. The shape of the supports' lower portion is designed to avoid interference with the slot 130 as the supports 124,126 rotate into and out of the slots 130 in the forward and rearward directions.

The rotation of the handle/supports/lid is constrained by the height of the supports 124,126, and further constrained by the force of the tensioning rod 112 at the followers 190 against the cam 180. These constraints define the path that the tensioning rod (and hence the connected handle/supports/lid structure) can travel. By providing side surfaces 181 on the cams 180 defining a curved path for the follower 190, the follower 190 remains in contact with the cam 180 as the handle 120 rotates the lid 160 open in either direction. When the follower 190 reaches the lateral cusp 187, the rotation of the handle/supports/lid has almost progressed to its maximum open position. As the follower 190 continues along the cam 180 past the cusp 187 to the recess 183, the rotation of the lid 160 with the base plate 140 terminates. If the height of the cam 180 is reduced by increasing the height of the spacer 182, the distance traveled by the follower 190 and the corresponding angular distance traveled by the handle/supports/lid structure is reduced, thereby controlling the degree of opening of the vent 100. Accordingly, the function of the spacer 182 to shorten the height the cam 180 and therefore shorten the path of the follower 190 reduces the maximum angular displacement a between the lid 160 and the base plate 140.

In a preferred embodiment, the distance between the bottom of the spacer to the indenture on the apex of the cam will be 0.974 inches, and the width of the cam at the lateral cusps 187 is 0.616 inches, at the recesses is 0.539 inches, and at the second pair of lateral cusps 193 is 0.627 inches. The radius of the recess is 0.210 inches and the radius of the curved convex side surfaces is 0.948 inches. The spacer is 2.500 inches in length and 0.138 inches in height, such that the height of the cam above the spacer is 0.836 inches. In a second preferred embodiment the dimensions referenced above fall within a range of 0.100 in either direction, and in a third preferred embodiment the dimensions referenced above fall within a range of 0.200 in either direction.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described above.

What is claimed is:

1. A vent of the type comprising a base plate, a handle connected to a pivoting lid, and a cam and follower assembly, the improvement comprising:
    a cam comprising an apex having an indenture thereon, a pair of convex side surfaces defining a follower path,
    a pair of recesses defining a follower stop, a juncture of the convex side surfaces with the recesses forming a pair of lateral, and
    wherein the cam is mounted to a spacer.

2. The vent of claim 1 wherein the lateral cusps of the cam divert the follower to its greatest distance away from an axis of symmetry of the cam.

3. The vent of claim 1 wherein the side surfaces of the cam each include curved segments adjacent both sides of the recess.

4. The vent of claim 3 wherein the intersection of the recesses with the curved segments form a second pair of lateral cusps.

5. The vent of claim 1 wherein the spacer is integrally formed with the cam.

6. The vent of claim 5 wherein the height of the spacer is greater than a distance between the spacer and the recess.

7. The vent of claim 6 wherein the distance between the spacer and the lateral cusps is approximately equal to a distance between the lateral cusps and the apex.

8. The vent of claim 1 wherein the recesses are positioned adjacent the spacer such that the follower can contact the spacer while located within the recess.

9. The vent of claim 1 wherein the convex side surfaces are circular.

10. The vent of claim 1 wherein the recesses are circular.

11. A vent of the type comprising a base plate, a handle connected to a pivoting lid, and a cam and follower assembly, the improvement comprising:
    a cam comprising an apex having an indenture thereon, a convex side surface defining a follower path, a recess defining a follower stop, and
    a spacer establishing the end of the follower path.

12. The vent of claim 11 wherein the convex side surface is circular.

13. The vent of claim 11 wherein the recess is circular.

14. The vent of claim 11 wherein the spacer is a rectangular bar integrally formed with the cam.

15. The vent of claim 11 wherein the recess is adjacent the spacer.

16. The vent of claim 15 wherein the convex surface is continuously circular from the apex to the recess.

17. A vent of the type comprising a base plate, a handle connected to a lid, and a cam and follower assembly, the improvement comprising:
    a cam comprising an apex having an indenture thereon, a pair of circularly convex side surfaces defining a follower path, and
    a pair of circular recesses at an end of the circularly convex side surfaces defining a follower stop, a juncture of the circularly convex side surfaces with the recesses forming a first pair of lateral cusps, the cam further comprising a pair of curved segments adjacent the recesses and a spacer adjacent the curved segments, the juncture of the recesses with the curved segments forming a second pair of lateral cusps, the distance between the first pair of lateral cusps and the distance between the second pair of lateral cusps being approximately equal, and
    the height of the spacer being no less than a length of the curved segments.

18. The vent of claim 17 wherein a height of the cam above the spacer is between 0.736 and 0.936 inches.

19. The vent of claim 17 wherein a radius of curvature of the circularly convex side surfaces is between 0.848 inches and 1.048 inches.

20. The vent of claim 17 wherein a radius of the recesses is between 0.110 inches and 0.310 inches.

21. The vent of claim 17 wherein a distance between the lateral cusps is between 0.516 inches and 0.716 inches.

22. The vent of claim 17 wherein a height of the spacer is at least 0.138 inches.

* * * * *